United States Patent
Yamada

(10) Patent No.: US 6,928,523 B2
(45) Date of Patent: Aug. 9, 2005

(54) SYNCHRONOUS SIGNAL PRODUCING CIRCUIT FOR CONTROLLING A DATA READY SIGNAL INDICATIVE OF END OF ACCESS TO A SHARED MEMORY AND THEREBY CONTROLLING SYNCHRONIZATION BETWEEN PROCESSOR AND COPROCESSOR

(75) Inventor: Akira Yamada, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 465 days.

(21) Appl. No.: 09/874,239

(22) Filed: Jun. 6, 2001

(65) Prior Publication Data

US 2002/0013872 A1 Jan. 31, 2002

(30) Foreign Application Priority Data

Jul. 25, 2000 (JP) .......................... 2000-223593

(51) Int. Cl.[7] .................... G06F 12/00; G06F 15/167
(52) U.S. Cl. .................... 711/147; 711/149; 711/152; 709/213; 712/34
(58) Field of Search .................... 711/147, 149, 711/150, 151, 152, 163; 709/213, 104; 712/34; 710/113, 240

(56) References Cited

U.S. PATENT DOCUMENTS

| | | | | |
|---|---|---|---|---|
| 5,274,809 A | * | 12/1993 | Iwasaki et al. | 718/104 |
| 5,495,617 A | * | 2/1996 | Yamada | 713/323 |
| 5,550,988 A | * | 8/1996 | Sarangdhar et al. | 710/113 |
| 6,006,319 A | * | 12/1999 | Takahashi et al. | 712/34 |
| 6,434,689 B2 | * | 8/2002 | Fleck et al. | 712/34 |
| 6,473,821 B1 | * | 10/2002 | Altmayer et al. | 710/240 |
| 6,557,084 B2 | * | 4/2003 | Freerksen et al. | 711/147 |

FOREIGN PATENT DOCUMENTS

JP 05-197551 8/1993

* cited by examiner

*Primary Examiner*—Kevin Verbrugge
(74) *Attorney, Agent, or Firm*—McDermott Will & Emery LLP

(57) ABSTRACT

A synchronous signal producing circuit includes an access inhibit region register for designating an access inhibit region for a processor in a shared memory, a comparing circuit for detecting the access by the processor to the access inhibit region designated in the access inhibit region register, and a logic circuit for issuing a P_DC signal setting the processor to a wait state based on a coprocessor instruction execution signal and a result of the comparison by the comparing circuit.

20 Claims, 15 Drawing Sheets

SYNCHRONOUS SIGNAL PRODUCING CIRCUIT FOR CONTROLLING A DATA READY SIGNAL INDICATIVE OF END OF ACCESS TO A SHARED MEMORY AND THEREBY CONTROLLING SYNCHRONIZATION BETWEEN PROCESSOR AND COPROCESSOR

BACKGROUND OF THE INVENTION

1. Field of the Invention

The present invention relates to a technology for ensuring synchronization between a processor and a coprocessor, and particularly relates to a synchronous signal producing circuit, which controls a data ready signal indicating an end of access to a shared memory, and thereby controls synchronization between the processor and the coprocessor, as well as a processor system and a synchronizing method using such a circuit.

2. Description of the Background Art

In recent years, fast processors have been employed in information processing equipment such as a personal computer as well as home electrical equipment, and it has been increasingly demanded to improve processing speeds. As a measure for improving the processing speeds, a coprocessor may be employed in addition to a processor so that the coprocessor may perform complicated arithmetic operations which cannot be efficiently done by the processor. A shared memory which can be accessed from both the processor and the coprocessor may be used for data transmission between the processor and coprocessor. This is effective at reducing data transferring operations.

In a system using the processor and coprocessor, the processor issues a coprocessor instruction to the coprocessor. After the coprocessor executed the coprocessor instruction, the result of execution is stored in the shared memory. While the coprocessor is executing the coprocessor instruction, the processor performs another operation in parallel. For utilizing the result of execution of the coprocessor instruction by the processor, the processor must access a region of the shared memory storing the result of execution of the coprocessor instruction after completion of the coprocessor instruction. This is referred to as "synchronization", "to synchronize" or the like in this specification.

If the processor uses data in a region of the shared memory, where the execution result of the coprocessor instruction is to be stored, before completion of the coprocessor instruction, this results in an erroneous operation. For avoiding this erroneous operation, such a manner is employed that the processor polls status flags in the coprocessor indicating the status of the coprocessor instruction processing, or receives an interrupt request sent from the coprocessor, and thereby the processor confirms the completion of the coprocessor instruction so that the processor and coprocessor are synchronized.

However, the foregoing manner in which the processor polls the status flags in the coprocessor requires a wasteful operation cycle for polling by the processor, and therefore suffers from a problem of reduction in operation speed. The manner in which the processor receives the interrupt request from the coprocessor requires overhead such as saving/restoring for a register is required for processing the interrupt processing. This also reduces the operation speed of the processor.

SUMMARY OF THE INVENTION

An object of the invention is to provide a synchronous signal producing circuit and a method of producing a synchronous signal, in which overhead is reduced in operations for synchronizing a processor and a coprocessor.

Another object of the invention is to provide a synchronous signal producing circuit and a method of producing a synchronous signal, in which a power consumption of a processor is reduced while keeping synchronization between a processor and a coprocessor.

Still another object of the invention is to provide a processor system, in which overhead is reduced in a whole system.

According to an aspect of the invention, a synchronous signal producing circuit for synchronizing access by a processor and a coprocessor to a shared memory, includes an access inhibit region register for designating an access inhibit region for the processor in the shared memory, a comparing circuit for detecting the access by the processor to the access inhibit region designated in the access inhibit region register, and a first logic circuit for issuing a signal setting the processor to a wait state based on a signal indicating that the coprocessor is executing a coprocessor instruction as well as a result of the comparison by the comparing circuit.

Since the first logic circuit issues the signal setting the processor to the wait state based on the signal indicating that the coprocessor is executing the coprocessor instruction as well as the result of comparison by the comparing circuit, a wasteful operation cycle of the processor is not required, and the overhead can be reduced.

According to another aspect, a processor system includes a processor, a coprocessor, a shared memory connected to the processor and the coprocessor, and a synchronous signal producing circuit for synchronizing access by the processor and the coprocessor to the shared memory. The synchronous signal producing circuit includes an access inhibit region register for designating an access inhibit region for the processor in the shared memory, a comparing circuit for detecting the access by the processor to the access inhibit region designated in the access inhibit region register, and a logic circuit for issuing a signal setting the processor to a wait state based on a signal indicating that the coprocessor is executing a coprocessor instruction as well as a result of the comparison by the comparing circuit.

Since the logic circuit issues the signal setting the processor to the wait state based on the signal indicating that the coprocessor is executing the coprocessor instruction as well as the result of comparison by the comparing circuit, a wasteful operation cycle of the processor is not required, and the overhead can be reduced in the whole processor system.

According to still another aspect of the invention, a method of producing a synchronous signal for synchronizing access by a processor and a coprocessor to a shared memory, includes the steps of designating an access inhibit region for the processor in the shared memory, detecting the access by the processor to the designated access inhibit region, and producing a signal setting the processor to a wait state based on a signal indicating that the coprocessor is executing a coprocessor instruction as well as a result of the detection.

Since the signal setting the processor to the wait state is issued based on the signal indicating that the coprocessor is executing the coprocessor instruction as well as the result of detection by the comparing circuit, a wasteful operation cycle of the processor is not required, and the overhead of the whole processor system can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a timing chart for showing operations of a processor 11 and a shared memory 12a;

FIG. 3 is a block diagram showing a schematic structure of a coprocessor 13a;

FIG. 4 shows timing of a coprocessor instruction execution signal of coprocessor 13a;

DESCRIPTION OF THE PREFERRED EMBODIMENTS (First Embodiment)

Figure 1:
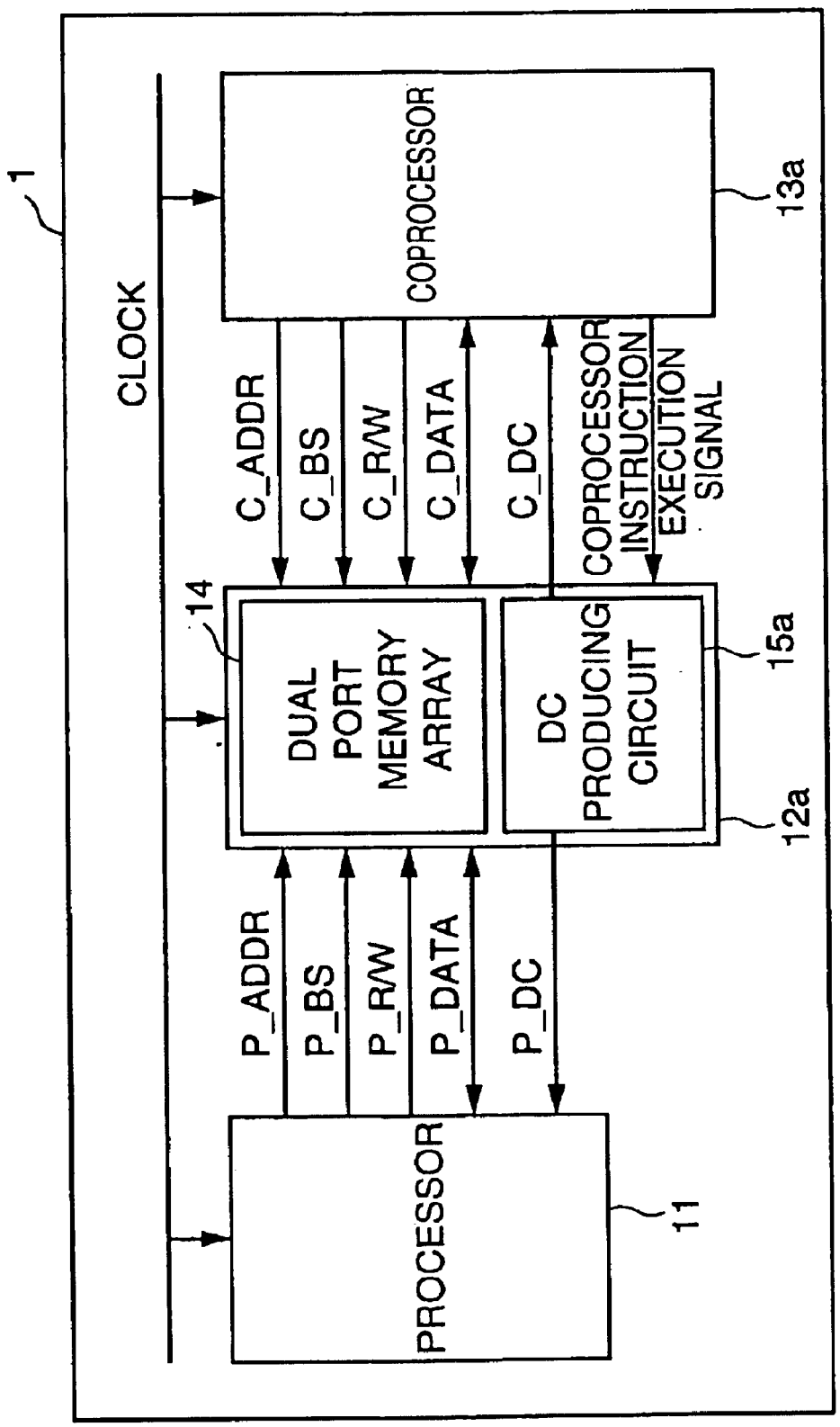
FIG. 1 is a block diagram showing a schematic structure of a processor system of a first embodiment of the invention.

FIG. 1 is a block diagram showing a schematic structure of a processor system of a first embodiment of the invention. This processor system 1 includes a processor 11, a shared memory 12a and a coprocessor 13a. Processor 11, shared memory 12a and coprocessor 13a are supplied with the same clock. While coprocessor 13a is executing a coprocessor instruction, processor 11 is executing another operation in parallel with coprocessor 13a.

For accessing shared memory 12a by processor 11, processor 11 issues an address (P_ADDR) signal, a bus start (P_BS) signal, and a read/write (P_R/W) signal. For reading out data by processor 11 from shared memory 12a, processor 11 is supplied with a value of a data bus (P_DATA). For writing data by processor 11 into shared memory 12a, data is output onto data bus (P_DATA). A data ready (P_DC) signal indicates the fact that the data is fixed at the time of access by processor 11 to shared memory 12a.

For accessing shared memory 12a by coprocessor 13a, coprocessor 13a issues an address signal (C_ADDR) signal, a bus start (C_BS) signal and a read/write (C_R/W) signal. For reading out data by coprocessor 13a from shared memory 12a, coprocessor 13a is supplied with a value of a data bus (C_DATA). For writing data by coprocessor 13a into shared memory 12a, coprocessor 13a outputs data onto data bus (C_DATA). A data ready (C_DC) signal indicates the fact that the data is fixed at the time of access by coprocessor 13a to shared memory 12a. A coprocessor instruction execution signal indicates that coprocessor 13a is executing the coprocessor instruction when it is at a high level (which will be simply referred to as "H-level", hereinafter).

Shared memory 12a includes a dual port memory array 14, and a DC producing circuit (synchronous signal producing circuit) 15a which produces the P_DC signal and C_DC signal for synchronizing processor 11 and coprocessor 13a.

Figure 2:
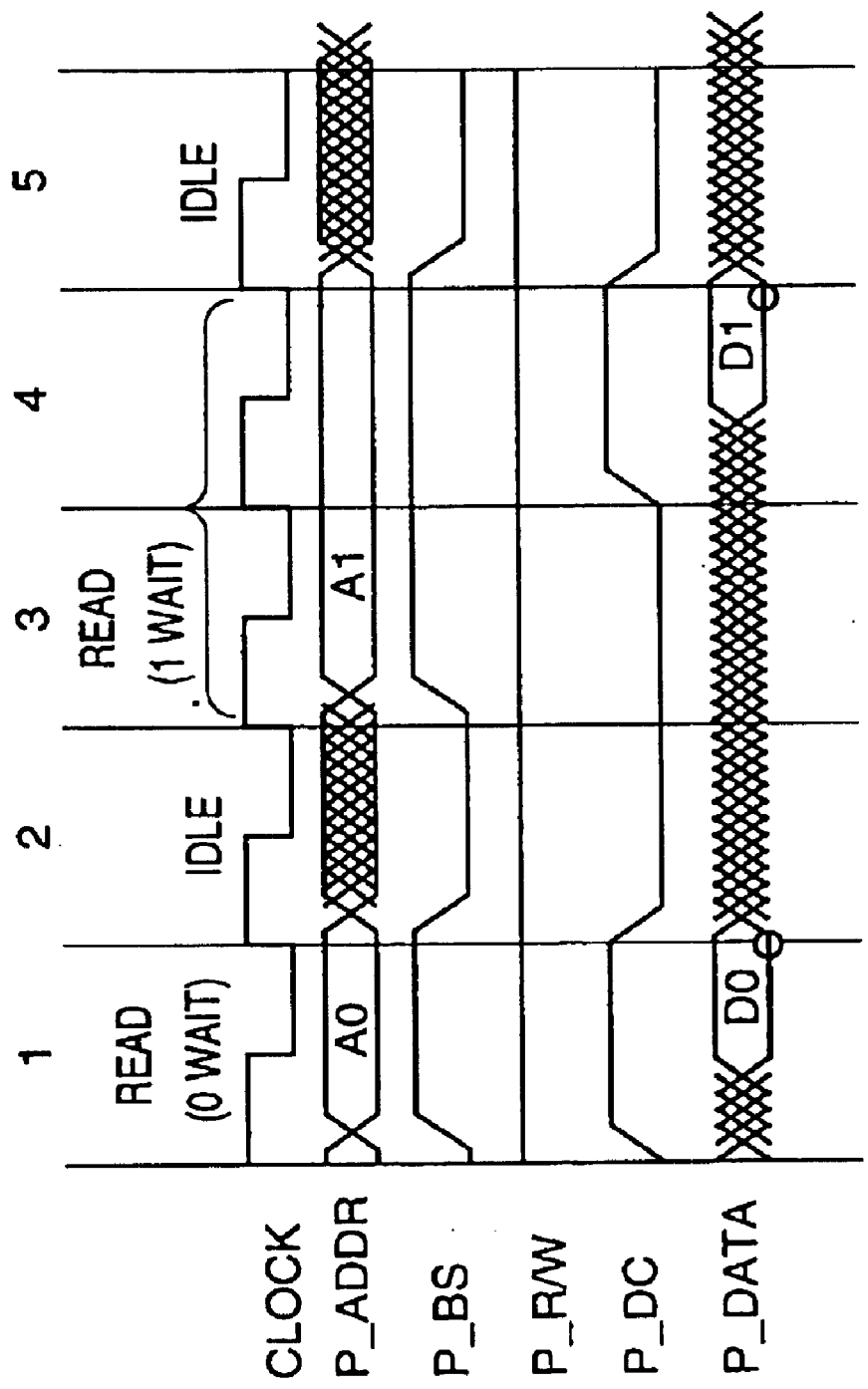

FIG. 2 is a timing chart showing operations of processor 11 and shared memory 12a. This timing chart shows the case (normal read access) where processor 11 reads out data from shared memory 12a. In a bus cycle "1", processor 11 sets both the P_BS and P_R/W signals to H-level, and outputs an address (A0) in shared memory 12a to be accessed as address signal P_ADDR. Shared memory 12a outputs data (D0) in a region designated by address signal P_ADDR onto data bus P_DATA. However, shared memory 12a outputs the P_DC signal at H-level in this cycle because the data is fixed in this cycle. A bus cycle "2" is an idle cycle.

In a bus cycle "3", processor 11 sets both the P_BS and P_R/W signals to H-level, and outputs address (A1) of shared memory 12a to be accessed as address signal P_ADDR. Shared memory 12a outputs data (D1) of a region designated by address signal P_ADDR onto data bus P_DATA. However, shared memory 12a holds the P_DC signal at a low level (which will be simply referred to as "L-level", hereinafter) in this cycle because the data is not fixed in this cycle. Since the data is fixed in a bus cycle "4", shared memory 12a outputs the P_DC signal at H-level in this cycle. A bus cycle "5" is an idle cycle.

For reading out data from shared memory 12a by coprocessor 13a, operations are performed in accordance with the same timing as those for reading out data from shared memory 12a by processor 11.

Figure 3:
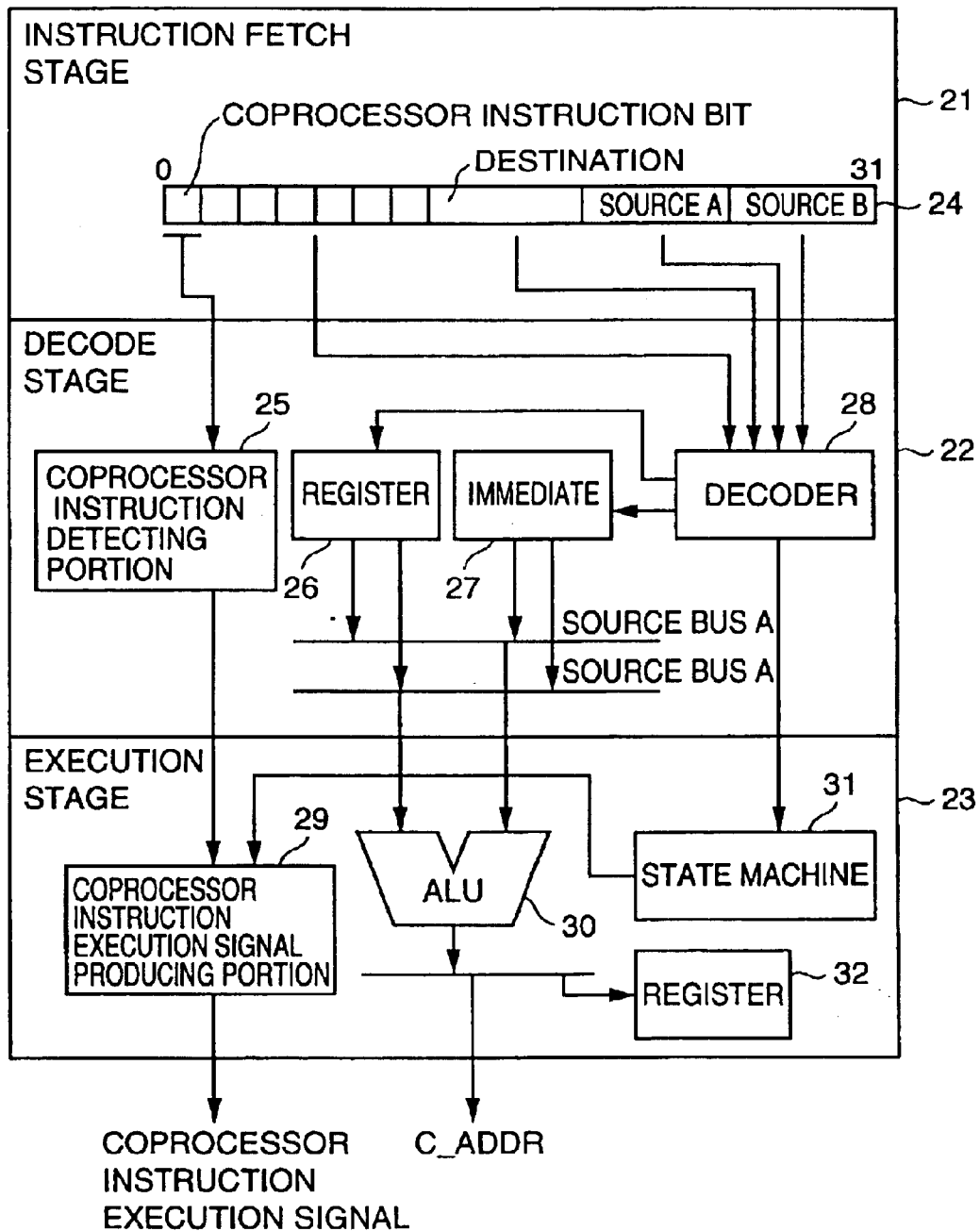

FIG. 3 is a block diagram showing a schematic structure of coprocessor 13a. Coprocessor 13 executes a coprocessor instruction by pipeline processing, and includes an instruction fetch stage 21, a decode stage 22 and an execution stage 23. FIG. 3 shows production of the coprocessor instruction execution signal, and therefore shows only a structure related thereto. For example, an ALU (Arithmetic and Logic Unit) 30 of execution stage 23 is configured to perform only address arithmetic. Structures relating to the data arithmetic are eliminated.

In instruction fetch stage 21, a fetched instruction is set in an instruction register 24. A coprocessor instruction bit is assigned to the highest bit of instruction register 24, and it is determined from this bit whether the instruction is a coprocessor instruction or not. A bit indicating a kind of the instruction in instruction register 24, a destination and sources A and B are supplied to a decoder 28 of decode stage 22.

In decode stage 22, a coprocessor instruction detecting portion 25 determines the coprocessor instruction bit in accordance with the same timing as the instruction decoding. If the instruction is the coprocessor instruction, notification of this fact is sent to coprocessor instruction execution signal producing portion 29 of execution stage 23. Decoder 28 decodes the bit indicating the kind of instruction of instruction register 24, the destination, and sources A and B, and determines the kind of instruction based on the result of this decoding. Thereby, selection of register 26 and setting of immediate 27 are performed.

In execution stage 23, a state machine 31 determines the number of execution cycles for the instruction based on the decode result of decoder 28. When the instruction execution cycle ends, state machine 31 notifies coprocessor instruction execution signal producing portion 29 of this. When coprocessor instruction execution signal producing portion 29 receives this notification from coprocessor instruction detecting portion 25, it sets the coprocessor instruction execution signal to H-level. When coprocessor instruction execution signal producing portion 29 is notified of the end of the instruction execution cycles by state machine 31, it sets the coprocessor instruction execution signal to L-level. ALU 30 is supplied with values of source buses A and B of decode stage 22, and performs address arithmetic, whereby address C_ADDR of common memory 12a to be accessed is output and/or internal register 32 is selected.

Figure 4:
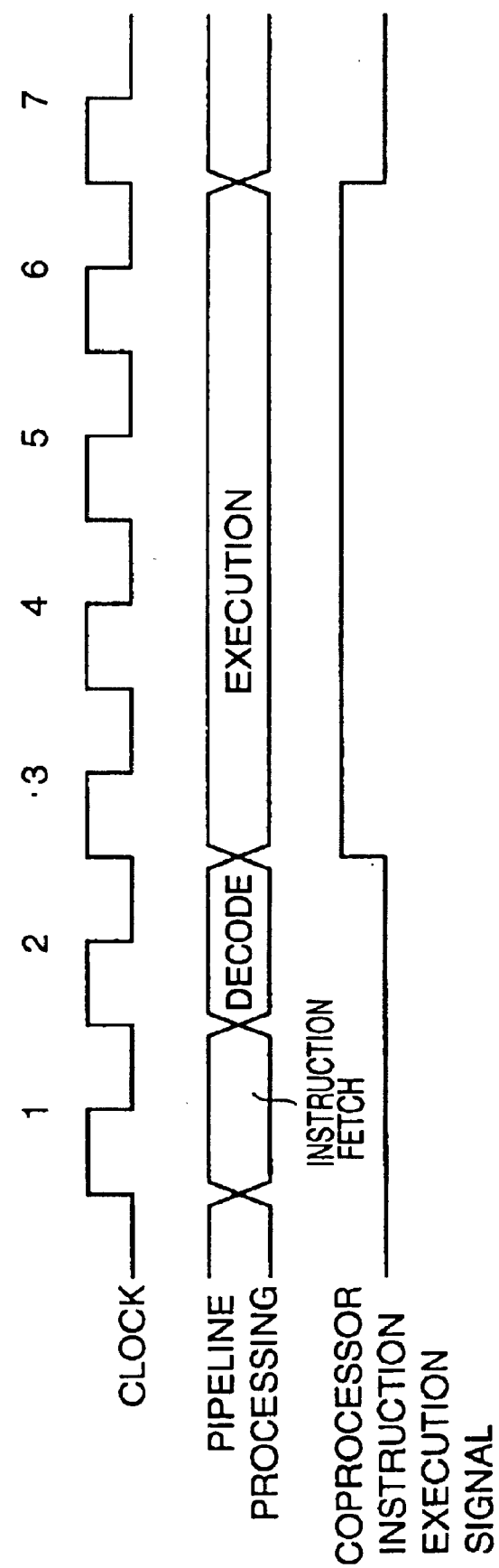

FIG. 4 shows timing of the coprocessor instruction execution signal of coprocessor 13a. The instruction is fetched in cycle "1", the fetched instruction is decoder in cycle "2". When it is determined from the result of decoding that the instruction is the coprocessor instruction, the coprocessor instruction execution signal attains H-level ("High"). In and after cycle "3", the coprocessor instruction is executed, and the coprocessor instruction execution signal attains L-level ("Low") when the execution cycle ends.

Figure 5:
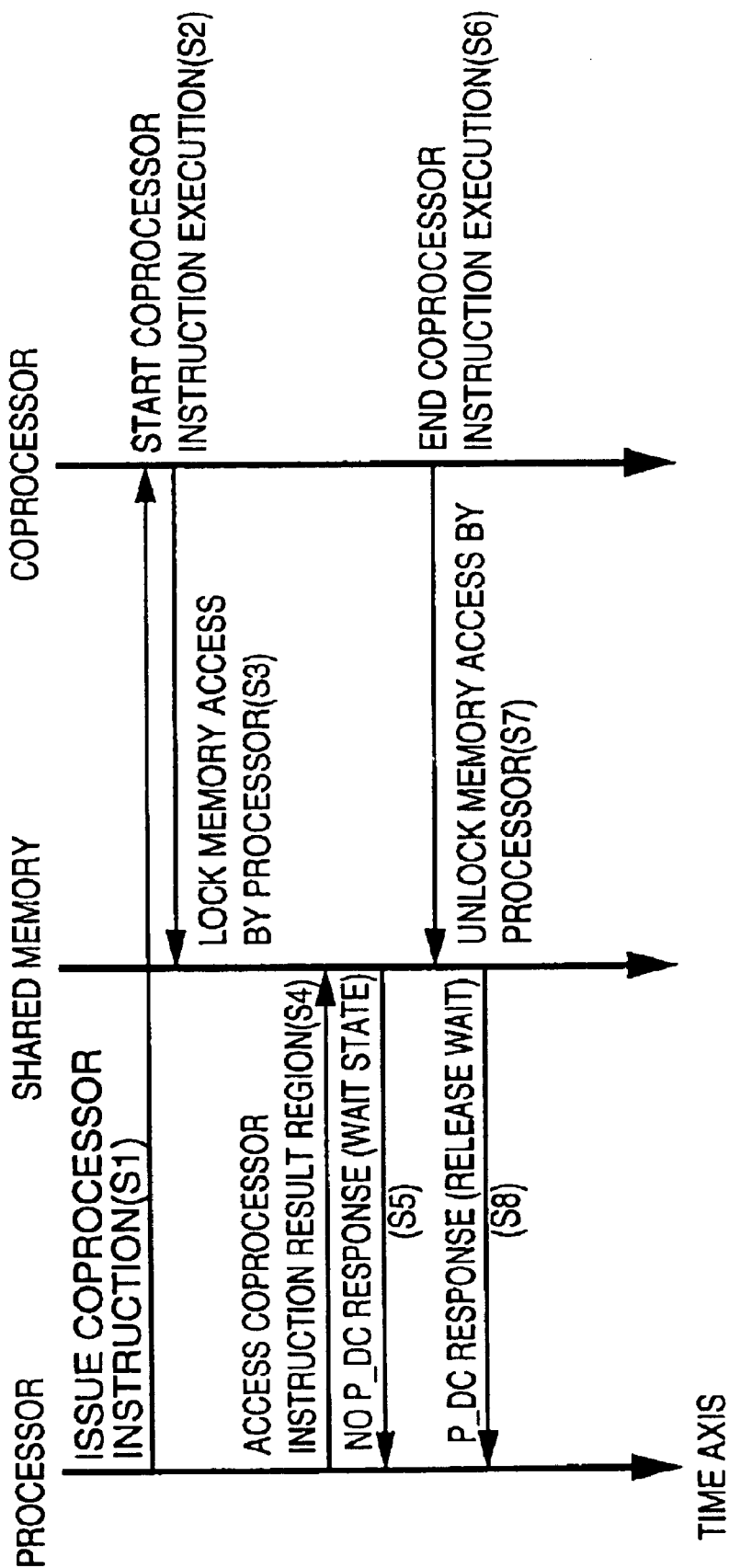
FIG. 5 shows processing of obtaining a result of execution of a coprocessor instruction after issuing the coprocessor instruction from processor 11.

FIG. 5 shows processing of obtaining a result of execution of a coprocessor instruction after issuing the coprocessor instruction from processor 11. When processor 11 issues a coprocessor instruction to coprocessor 13a (S1), coprocessor 13a starts execution of the coprocessor instruction (S2), and the memory access by processor 11 to shared memory 12a is locked (S3). Processor 11 may issue the coprocessor instruction to coprocessor 13a in various manners. For example, coprocessor 13a may fetch the instruction with the same timing as processor 11, and may start execution of the fetched instruction if it is an coprocessor instruction. Also, processor 11 may write a coprocessor instruction into an instruction memory region, although not restricted to these manners.

For obtaining the execution result of the coprocessor instruction by processor 11, shared memory 12a is accessed (S4). Thereby, shared memory 12a issues the P_DC signal at L-level to processor 11 for setting it to the wait state (S5).

When coprocessor 13a completes the execution of the coprocessor instruction (S6), processor 11 releases the locked state of the memory access (S7), and shared memory 12a issues the P_DC signal at H-level to processor 11 for releasing the wait state (S8). As a result, processor 11 obtains the result of execution of the coprocessor instruction from shared memory 12a.

Figure 6:
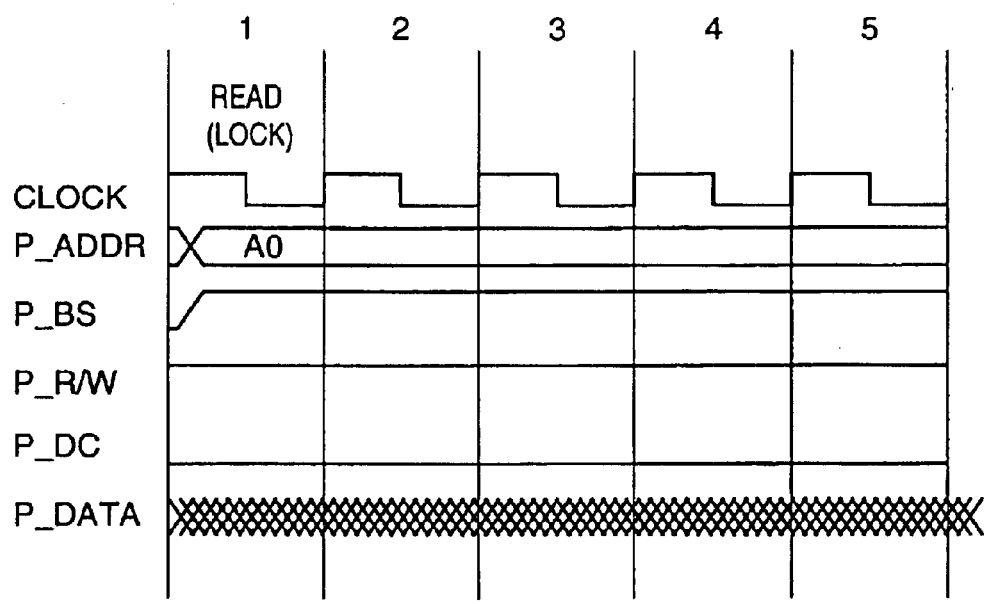
FIG. 6 is a timing chart showing a state where memory access by processor 11 to shared memory 12a is locked.

FIG. 6 is a timing chart showing a state where memory access by processor 11 to shared memory 12a is locked. After the system enters the locked state in cycle "1", processor 11 may access a region of shared memory 12a where the execution result of the coprocessor instruction is stored. Even in this case, shared memory 12a keeps the P_DC signal at L-level, and processor 11 stays in the wait state. Accordingly, processor 11 is prevented from a malfunction of reading out erroneous data.

When coprocessor 13a completes the execution of coprocessor instruction, shared memory 12a is released from the locked state, and sets the P_DC signal to H-level. As a result, the data in the region of shared memory 12a designated by a P_ADDR signal is output onto data bus P_DATA, and processor 11 reads the result of execution of the coprocessor instruction.

Figure 7:
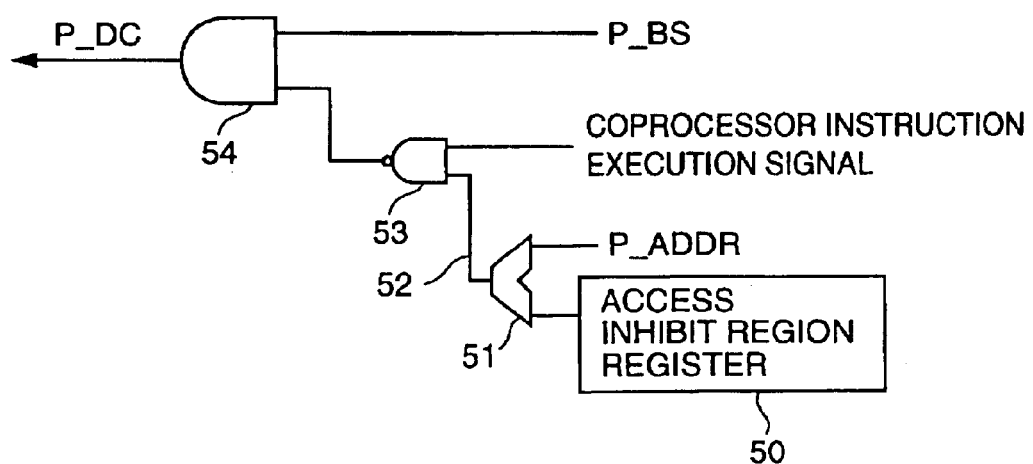
FIG. 7 shows an example of a circuit producing a P_DC signal to be sent to processor 11.

FIG. 7 shows an example of a circuit producing the P_DC signal to be sent to processor 11. This P_DC producing circuit is depicted as a circuit, which operates with zero wait states when processor 11 performs normal access to shared memory 12a. The P_DC producing circuit includes an access inhibit region register 50, a comparator 51, an NAND circuit 53 and an AND circuit 54. A value indicating an address of the region in shared memory 12, where access by processor 11 is to be inhibited during execution of the coprocessor instruction by coprocessor 13, is set in access inhibit region register 50. Comparator circuit 51 compares the value set in access inhibit region register 50 with a value of P_ADDR sent from processor 11, and issues a match signal 52 at H-level when there is a match.

When processor 11 accesses the region at the address stored in access inhibit region register 50, match signal 52 issued from comparator 51 attains H-level. At the same time, coprocessor 13a may be executing the coprocessor instruction, in which case the coprocessor instruction execution signal attains H-level so that the output of NAND circuit 53 attains L-level. As a result, the P_DC signal, which is an output of AND circuit 54, attains L-level so that processor 11 enters the wait state.

When coprocessor 13a finishes the execution of the coprocessor instruction, the coprocessor instruction execution signal attains L-level, and the output of NAND circuit 53 attains H-level. Since the P_BS signal is at H-level, the P_DC signal which is the output of AND circuit 54 attains H-level, and processor 11 is released from the wait state.

According to the processor system of this embodiment, as described above, processor 11 is in the locked state, which inhibits the access to the region of shared memory 12a storing the result of execution of the coprocessor instruction, while coprocessor 13a is executing the coprocessor instruction. Therefore, processor 11 is prevented from reading output an erroneous execution result. Since processor 11 is merely in the wait state until the end of execution of the coprocessor instruction, processor 11 does not require wasteful operation cycles, e.g., for polling and/or interruption so that the operation speed of processor 11 can be improved, and the power consumption can be reduced.

(Second Embodiment)

Figure 8:
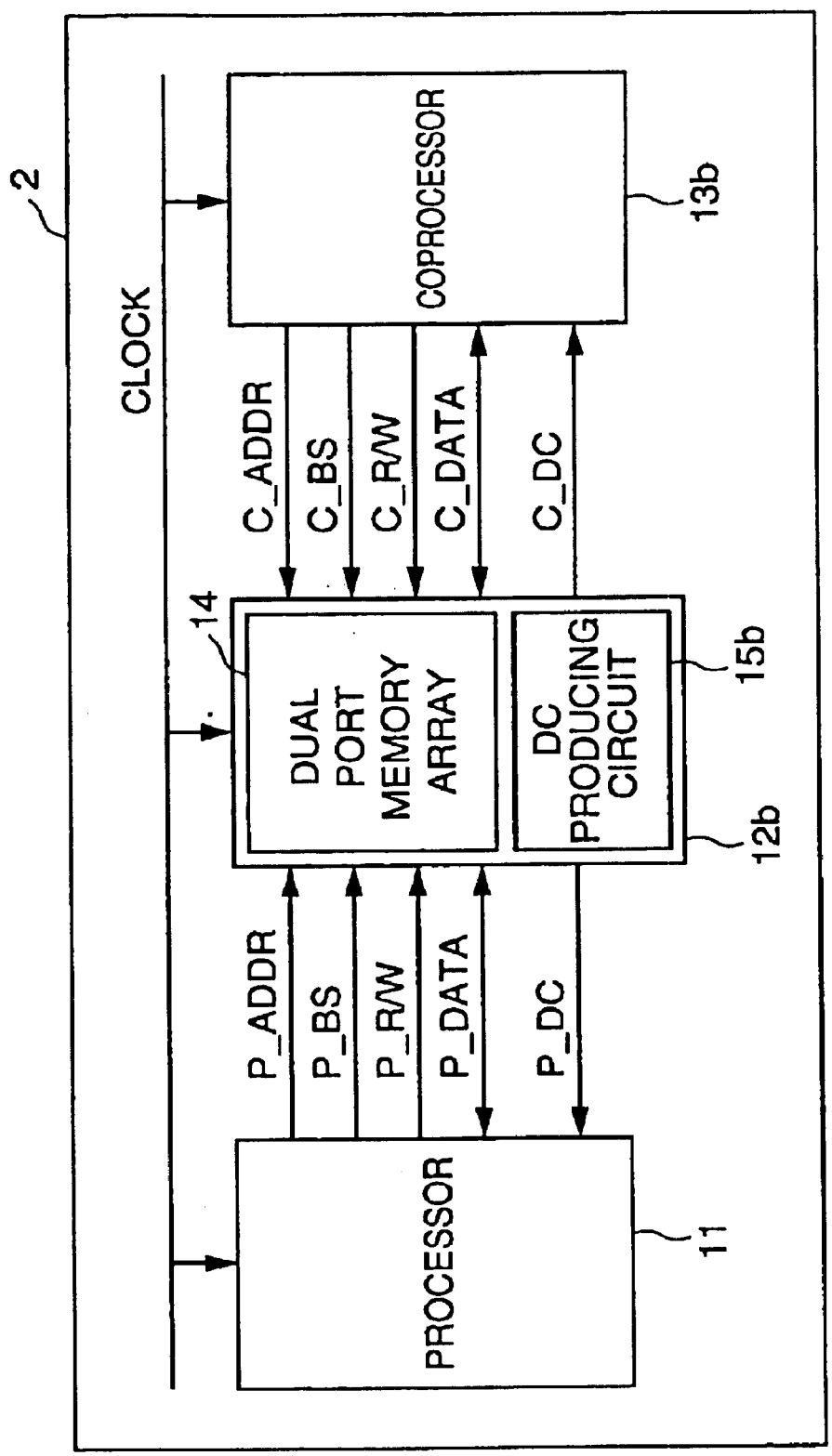
FIG. 8 is a block diagram showing a schematic structure of a processor system of a second embodiment of the invention.

FIG. 8 is a block diagram showing a schematic structure of a processor system of a second embodiment of the invention. The structure of this processor system 2 differs from the structure of the processor system of the first embodiment shown in FIG. 1 only in internal structures of the shared memory and the coprocessor. Accordingly, description of the same structures and functions is not repeated. In this embodiment, the shared memory and the coprocessor are indicated at 12b and 13b, respectively.

Coprocessor 13b of the second embodiment differs from coprocessor 13a of the first embodiment shown in FIG. 3 only in that the circuit for producing the coprocessor instruction execution signal is eliminated. Accordingly, description of the same structures and functions is not repeated.

Figure 9:
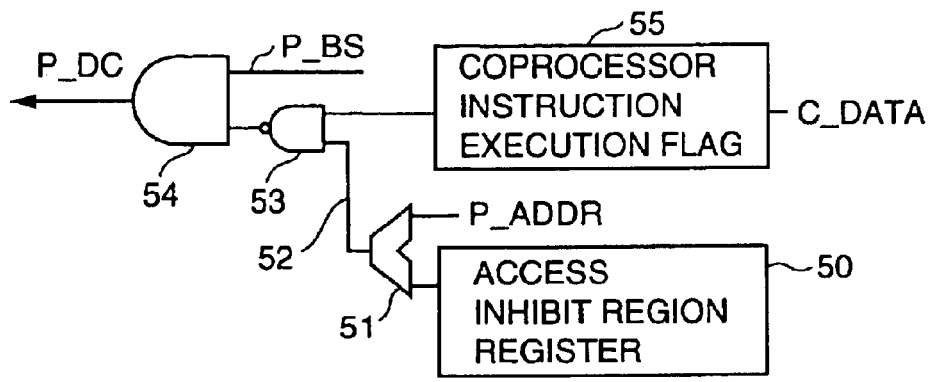
FIG. 9 shows by way of example a circuit producing a P_DC signal to be sent to processor 11.

FIG. 9 shows an example of a circuit for producing the P_DC signal to be sent to processor 11. This P_DC producing circuit is depicted as a circuit, which operates with zero wait states when processor 11 performs normal access to shared memory 12b. The P_DC producing circuit includes access inhibit region register 50, comparator 51, NAND circuit 53, AND circuit 54 and a coprocessor instruction execution flag 55. A value indicating an address of the region in shared memory 12, where access by processor 11 is to be inhibited during execution of the coprocessor instruction by coprocessor 13, is set in access inhibit region register 50. Comparator circuit 51 compares the value set in access inhibit region register 50 with a value of P_ADDR sent from processor 11, and issues match signal 52 at H-level when there is a match.

Coprocessor instruction execution flag 55 is a flag, into which a value is to be written in accordance with an instruction issued by coprocessor 13b, and is formed of flip-flops and others. The value written into coprocessor instruction execution flag 55 is the value of data bus C_DATA at the time of issuance of the instruction by coprocessor 13b. Coprocessor 13b sets "1" in coprocessor instruction execution flag 55 for executing the coprocessor instruction. When coprocessor 13b completes the execution of the coprocessor instruction, it sets "0" in coprocessor instruction execution flag 55.

When processor 11 accesses the region, of which address is stored in access inhibit region register 50, comparator 51 issues the match signal at H-level. In this state, "1" may already be set in coprocessor instruction execution flag 55 by coprocessor 13a, in which case the output of NAND circuit 53 attains L-level. Consequently, the output (i.e., P_DC signal) of AND circuit 54 is at L-level, and processor 11 assumes the wait state.

When coprocessor 13a completes execution of the coprocessor instruction, it sets "0" in coprocessor instruction execution flag 55, and the output of NAND circuit 53 attains H-level. Since the P_BS signal is at H-level, the output (I.e., P_DC signal) of AND circuit 54 attains H-level, and processor 11 is released from the wait state.

In the operation of executing the coprocessor instruction by coprocessor 13b, a large amount of execution results may be produced, and therefore it may be required to write a large amount of data into shared memory 12b. In this case, it is possible to change the region to be locked in shared memory 12b in accordance with progress of execution of the coprocessor instruction. Owing to this change, the operation of processor 11 can advance within a range of shared memory 12b where the execution result is already written. An example of the circuit for the above operations will now be described.

Figure 10:
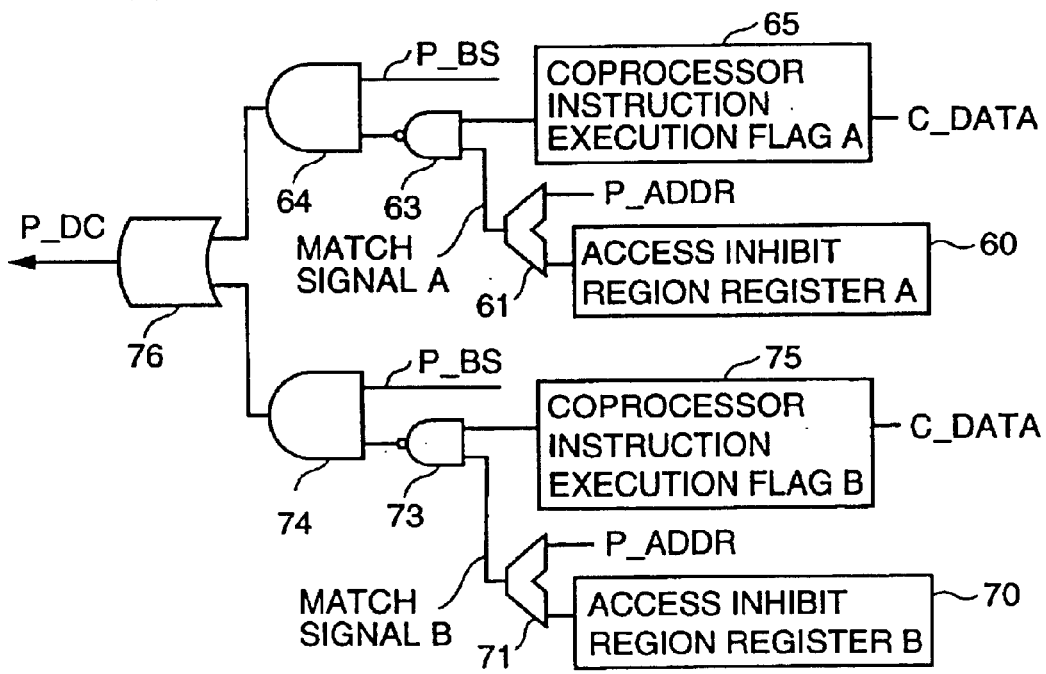
FIG. 10 shows a P_DC signal producing circuit which can sets two kinds of access inhibit regions for processor 11.

FIG. 10 shows a P_DC signal producing circuit, which can set two kinds of access inhibit regions, which cannot be accessed by processor 11. This P_DC signal producing circuit is depicted as a circuit operating with zero wait states when processor 11 performs normal access to shared memory 12b. The P_DC signal producing circuit includes access inhibit region registers A and B (60 and 70), comparators 61 and 71, NAND circuits 63 and 73, AND circuits 64 and 74, coprocessor instruction execution flags A and B (65 and 75), and an OR circuit 76. The circuit shown in FIG. 10 is formed of two circuit structures, each of which is the same as that shown in FIG. 9, as well as OR circuit 76 receiving the outputs of AND circuits 64 and 74 of these circuit structures.

Access inhibit region registers A and B (60 and 70) are loaded with addresses of different regions in shared memory 12, respectively, where access by processor 11 is to be inhibited while coprocessor 13b is executing the coprocessor instruction. When executing the coprocessor instruction, coprocessor 13b sets access inhibit regions A and B in access inhibit region registers A and B (60 and 70), respectively.

When it is allowed to unlock access inhibit region A or B in accordance with progress of execution of the coprocessor instruction by coprocessor 13b, coprocessor 13b sets "0" in the coprocessor instruction execution flag corresponding to it. As a result, one of the two regions in shared memory (12b) is released from the locked state, and processor 11 is allowed to access the unlocked region. When coprocessor 13b completes the execution of coprocessor instruction, the other coprocessor instruction execution flag is loaded with "0", and the locked state of shared memory 12b is completely released.

According to the processor system of the second embodiment, as described above, coprocessor 13b issues an instruction, and sets a value in the coprocessor instruction execution flag for locking the access by processor 11. Therefore, it is possible to prevent processor 11 from erroneously reading out the execution result. Since processor 11 is merely in the wait state until the execution of coprocessor instruction is completed, processor 11 does not require wasteful operation cycles, e.g., for polling and/or interruption so that the operation speed of processor 11 can be improved, and the power consumption can be reduced.

Since the plurality of access inhibit regions can be set, the operation of processor 11 can advance within a range of shared memory 12b where the execution result is already written, if a large amount of execution results are present, and a large amount of data is to be written into shared memory 12b.

(Third Embodiment)

In general, a processor system performs bus access error recovery when an error occurs in bus access. As a typical example, such a bus access error may occur that a processor accesses a region where a memory is not present, and therefore cannot receive a DC signal as a response so that a processor hangs up. For dealing with this bus access error, such a manner is generally employed that the processor detects the fact that a wait exceeding an estimated wait is inserted at the time of bus access, and performs subsequent processing.

In the processor systems of the first and second embodiments of the invention, access to the shared memory by the processor is restricted until the coprocessor completes the execution of coprocessor instruction, and the DC signal is kept at L-level during the above restriction so that the processor is kept in the wait state. Accordingly, the original bus access error and the wait state, which is inserted for synchronizing the processor and the coprocessor, may cause confusion, and this state may be erroneously recognized as a bus access error during the operation of synchronizing the processor and the coprocessor. The processor system of a third embodiment can prevent such erroneous recognition of the bus access error.

Figure 11:
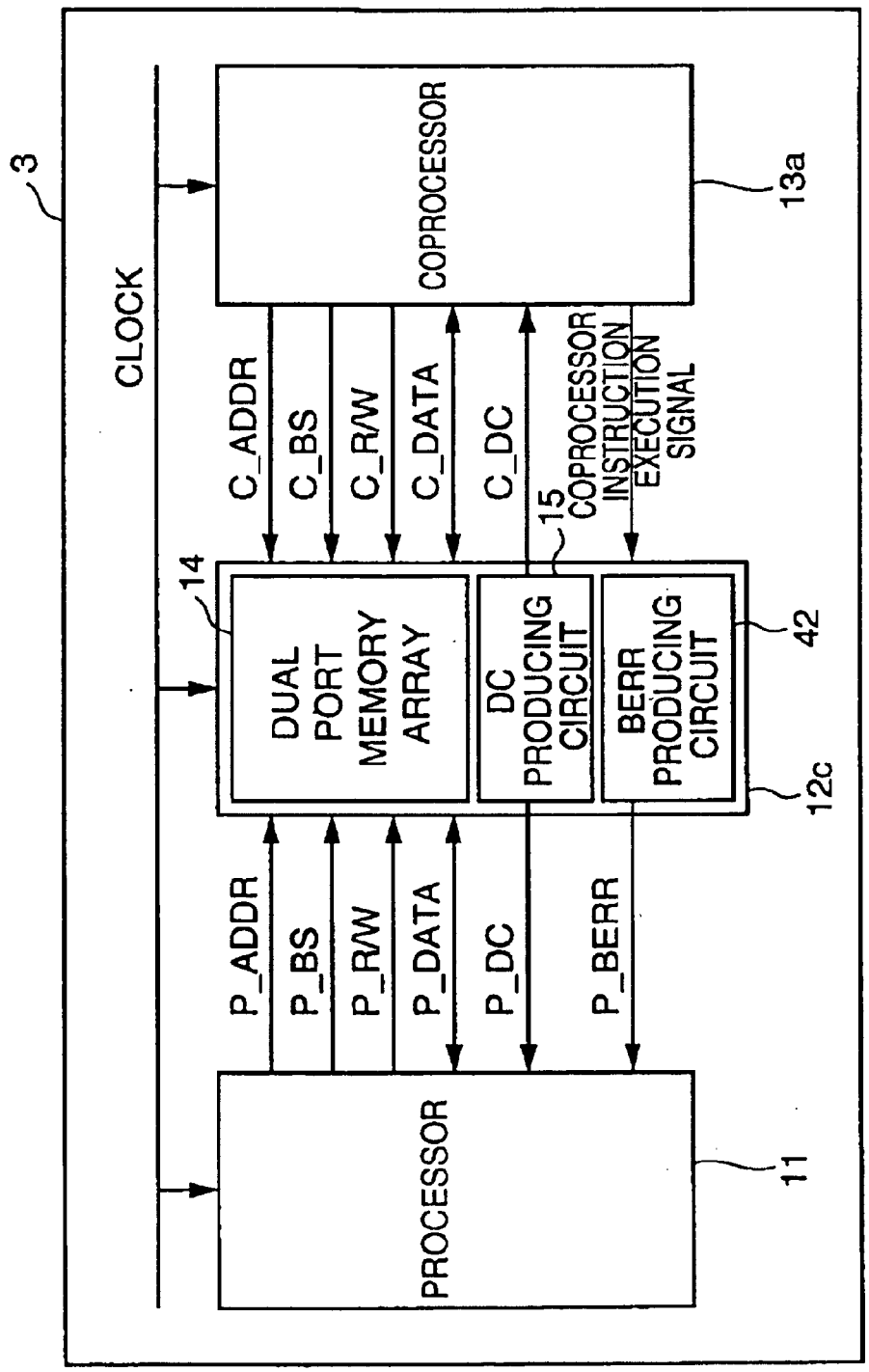
FIG. 11 is a block diagram showing a schematic structure of a processor system of a third embodiment of the invention.

FIG. 11 is a block diagram showing a schematic structure of a processor system 3 of the third embodiment of the invention. The structure of this processor system 3 differs from that of the processor system of the first embodiment shown in FIG. 1 only in that a BERR producing circuit 42 is added in a shared memory 12c, and that a P_BERR signal is supplied to processor 11. Description of the same structures and functions is not repeated.

Figure 12:
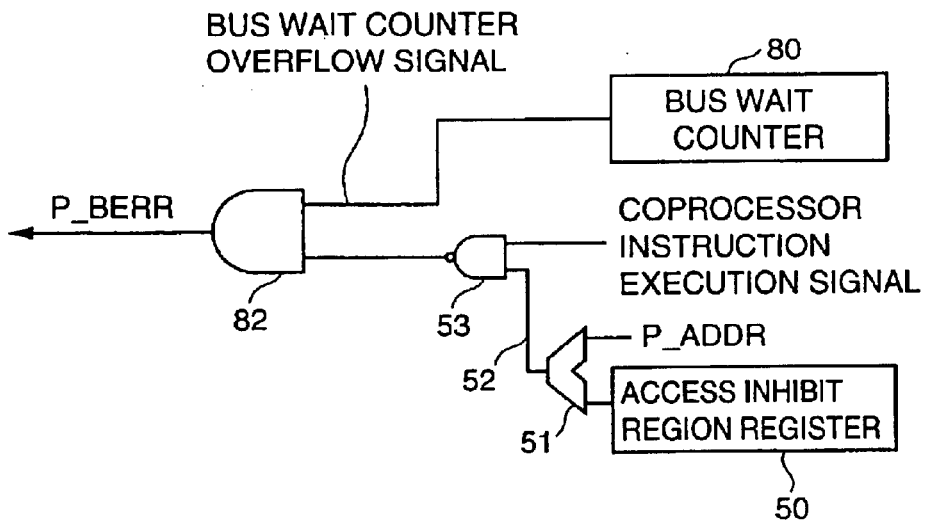
FIG. 12 shows by way of example a structure of a BERR producing circuit 42.

FIG. 12 shows a structure of BERR peripheral circuit 42. BERR producing circuit 42 includes access inhibit region register 50, comparator 51, NAND circuit 53, a bus wait counter 80 and an AND circuit 82. Bus wait counter 80 counts the number of wait cycles, and sets a bus wait counter overflow signal to H-level when overflow occurs.

When processor 11 accesses a region corresponding to the address stored in access inhibit region register 50, match signal 52 issued from comparator 51 attains H-level. If coprocessor 13a is executing the coprocessor instruction in the above state, the coprocessor instruction execution signal attains H-level so that the output of NAND circuit 53 attains L-level. As a result, the output (i.e., P_BERR signal) of AND circuit 82 attains L-level independently of the value of bus wait counter 80, and the bus access error recovery processing is not performed.

When coprocessor 13a completes the execution of coprocessor instruction, the coprocessor instruction execution signal attains L-level, and the output of NAND circuit 53 attains H-level. However, bus wait counter 80 stays at L-level. Therefore, the P_BERR signal stays at L-level. When coprocessor 13a is not executing the coprocessor instruction, the output of NAND circuit 53 attains H-level, and the P_BERR signal attains H-level when overflow occurs in bus wait counter 80. Accordingly, processor 11 can be notified of a normal bus access error.

Figure 13:
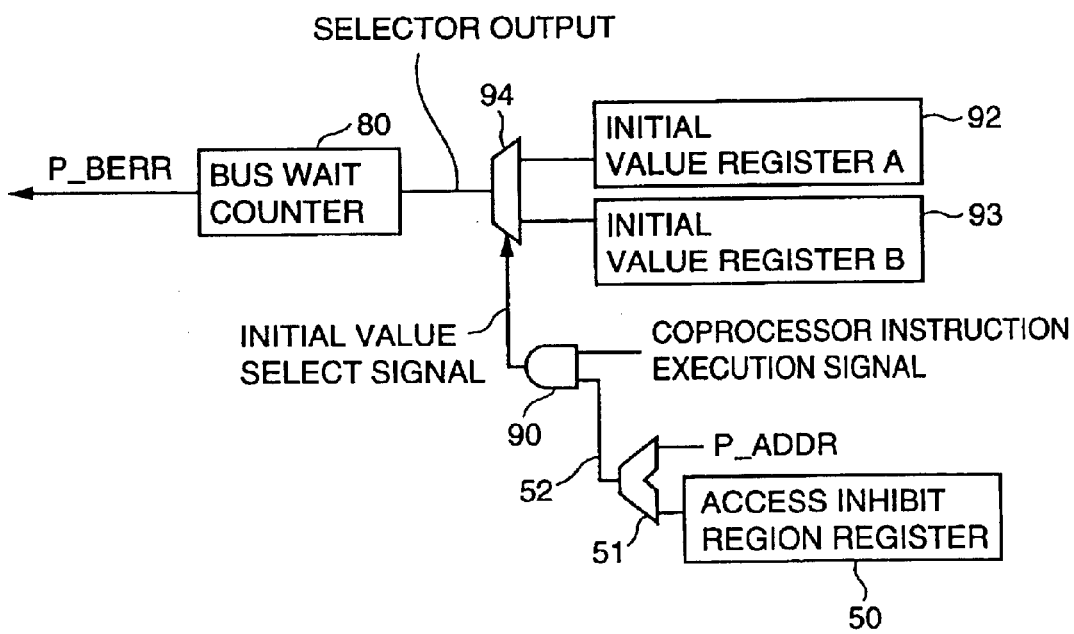
FIG. 13 shows another example of the structure of BEER producing circuit 42.

FIG. 13 shows another example of a structure of BERR producing circuit 42. BERR producing circuit 42 includes access inhibit region register 50, comparator 51, bus wait counter 80, an AND circuit 90, initial value registers A and B (92 and 93), and a selector 94. Bus wait counter 80 counts the number of wait cycles, and issues the bus wait counter overflow signal at H-level when overflow occurs.

Initial value register A (92) stores an initial value, which is set in bus wait counter 80 when coprocessor 13a is executing the coprocessor instruction. Initial value register B (93) stores an initial value, which is set in bus wait counter 80 during a normal access.

When processor 11 access a region corresponding to the address stored in access inhibit region register 50, match signal 52 sent from comparator 51 attains H-level. If coprocessor 13a is executing the coprocessor instruction in the above state, the coprocessor instruction execution signal attains H-level, and the initial value selecting signal attains H-level. Therefore, selector 94 selects the output of initial value register A (92), and sets it in bus wait counter 80. Bus counter 80 counts the number of wait cycles, and issues the P_BERR signal at H-level when the count exceeds the value set in initial value register A (92).

When coprocessor 13a completes the execution of coprocessor instruction, the coprocessor instruction execution signal attains L-level, and the initial value select signal attains L-level. Therefore, selector 94 selects the output of initial value register B (93), and sets it in bus wait counter 80. Bus counter 80 counts the number of wait cycles, and issues the P_BERR signal at H-level when the count exceeds the value set in initial value register B (93).

According to the processor system of this embodiment, as described above, the P_BERR signal at L-level is issued while coprocessor 13a is executing the coprocessor instruction. Therefore, it is possible to prevent such a situation that a bus access error occurs due to the wait which occurs when synchronizing processor 11 and coprocessor 13a.

Since the initial value of the number of wait cycles which occur during execution of the coprocessor instruction by coprocessor 13a is set independently of the initial value of the number of wait cycles during the normal bus access by processor 11, the bus access error can be prevented owing to independent setting of appropriate initial values.

(Fourth Embodiment)

In the processor systems of the first to third embodiments, access to the shared memory by the processor is restricted until completion of execution of the coprocessor instruction by the coprocessor, and the DC signal is kept at L-level for keeping the processor in the wait state during the above restriction. However, the clock signal is supplied to processor 11 even during the above restriction. This results in wasteful power consumption. In a processor system of a fourth embodiment, a P_STOP signal is sent to processor 11 for setting processor 11 in a low power consumption mode. Typically, the low power consumption mode is achieved by stopping supply of a clock to processor 11, although not restricted to this.

Figure 14:
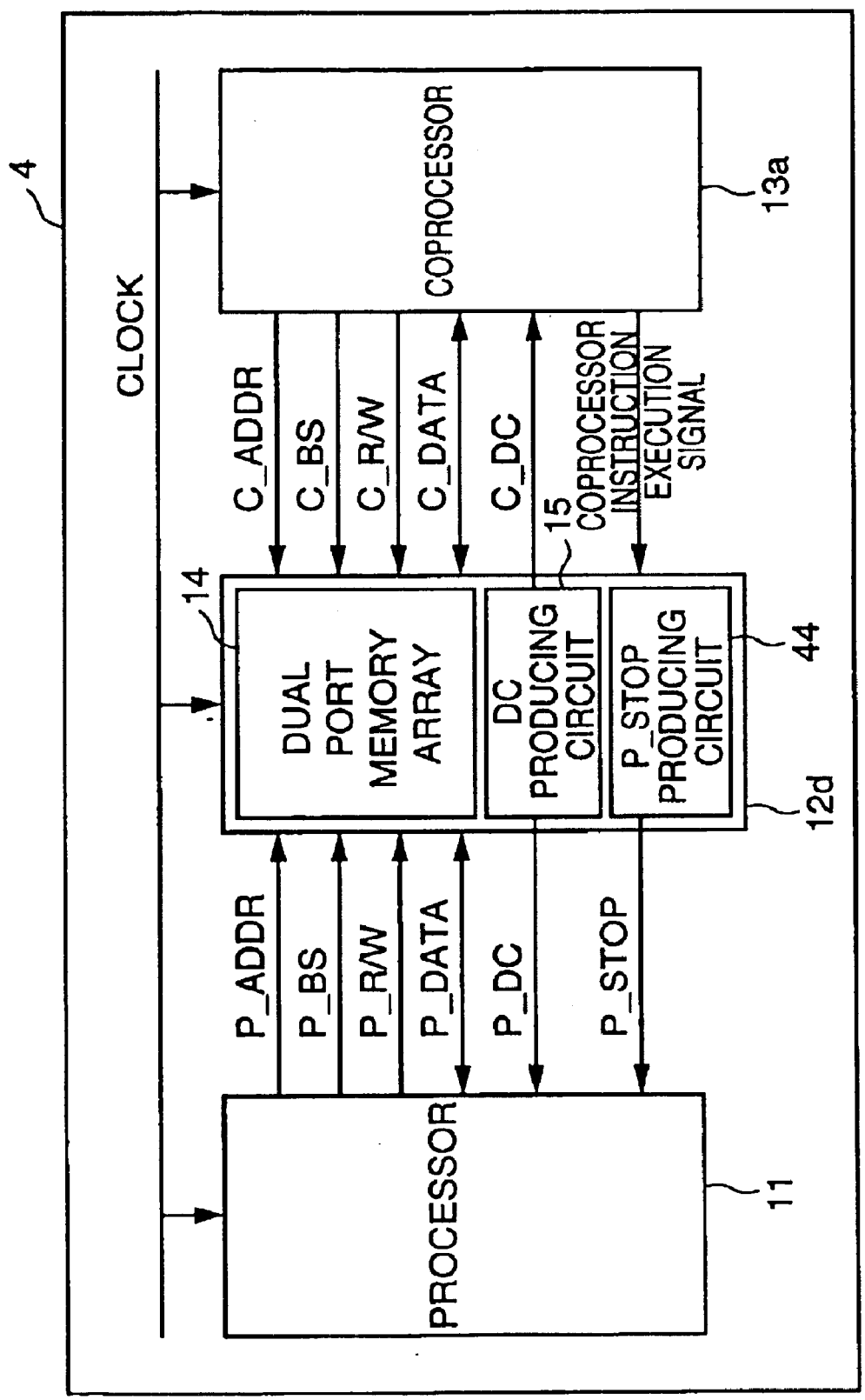
FIG. 14 is a block diagram showing a schematic structure of a processor system of a fourth embodiment of the invention.

FIG. 14 is a block diagram showing a schematic structure of a processor system of the fourth embodiment. The structure of processor system 4 differs from the structure of the processor system of the first embodiment shown in FIG. 1 in that a P_STOP producing circuit 44 is added into a shared memory 12d, and that the P_STOP signal is applied to processor 11. Description of the same structures and functions is not repeated.

Figure 15:
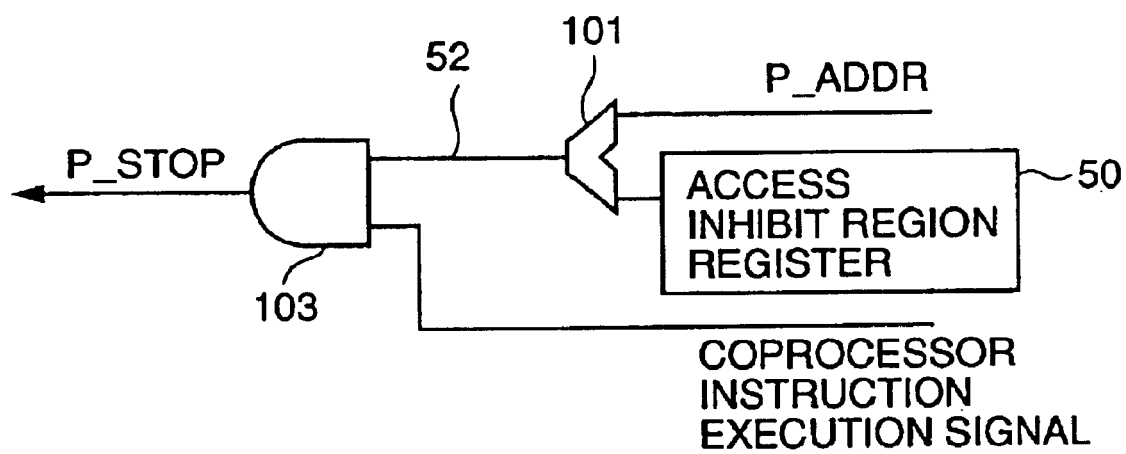
FIG. 15 shows an example of a structure of a P_STOP producing circuit 44.

FIG. 15 shows a structure of P_STOP producing circuit 44. P_STOP producing circuit 44 includes access inhibit region register 50, a comparator 101 and an AND circuit 103. When processor 11 accesses a region corresponding to the address stored in access inhibit region register 50, comparator 101 issues match signal 52 at H-level. If coprocessor 13a is executing the coprocessor instruction in the above state, the coprocessor instruction execution signal attains H-level so that the output of AND circuit 103 attains H-level. As a result, the output of AND circuit 103, i.e., P_STOP signal attains H-level, and processor 11 enters the low power consumption mode.

According to the processor system of this embodiment, as described above, processor 11 enters the wait state and the low power consumption mode when processor 11 accesses the access inhibit region during execution of the coprocessor instruction by coprocessor 13a. Therefore, an effect of further reducing the power consumption can be achieved in addition to the effect already described in connection with the first embodiment.

(Fifth Embodiment)

In the processor systems of the first to fourth embodiments of the invention, access to the shared memory by the processor is restricted until completion of execution of the coprocessor instruction by the coprocessor, and the DC signal is kept at L-level for keeping the processor in the wait state during the above restriction. If it is possible to detect or determine the status of change in data value in the access inhibit region of the shared memory while the processor and coprocessor are being debugged, this is effective in a program debug operation. In a processor system of this embodiment, a coprocessor executes an LD_NOLOCK instruction to issue an LD_NOLOCK instruction execution signal.

Figure 18:
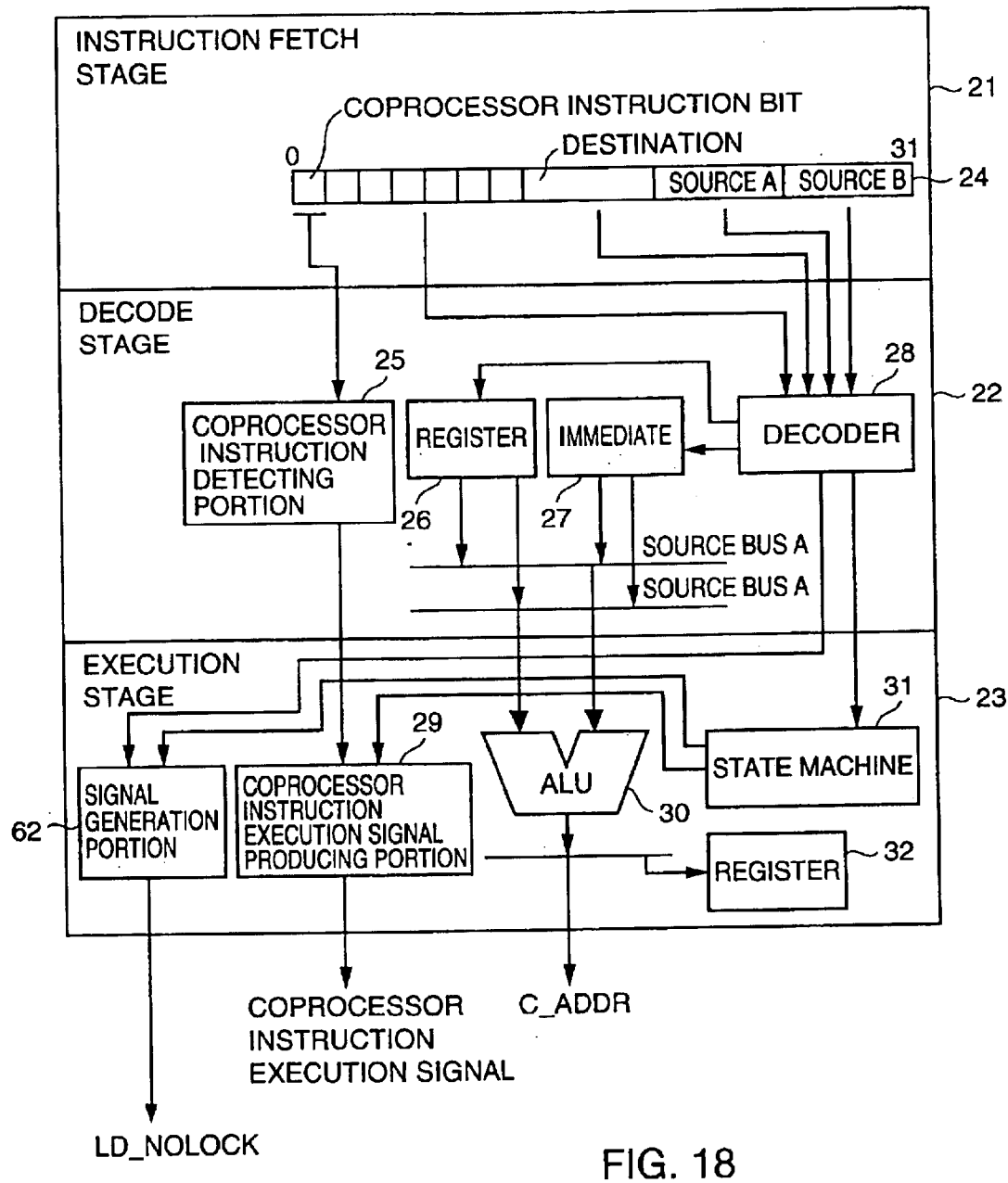
FIG. 18 shows a schematic structure of a coprocessor 13a of a fifth embodiment of the invention.

This LD_NOLOCK instruction execution signal can be produced from a circuit, which has structures similar to those of coprocessor instruction detecting portion 25 and coprocessor instruction execution signal producing portion 29 shown in FIG. 3. Referring to FIG. 18, decoder 28 detects LD_NOLOCK instruction in register 24 and notifies the detection. A signal generation portion 62 sets LD_NOLOCK signal to L-level when the notification of detection of LD_NOLOCK instruction is issued from decoder 28, and sets LD_NOLOCK to H-level when the notification of end of the execution cycle is issued from state machine 31.

Figure 16:
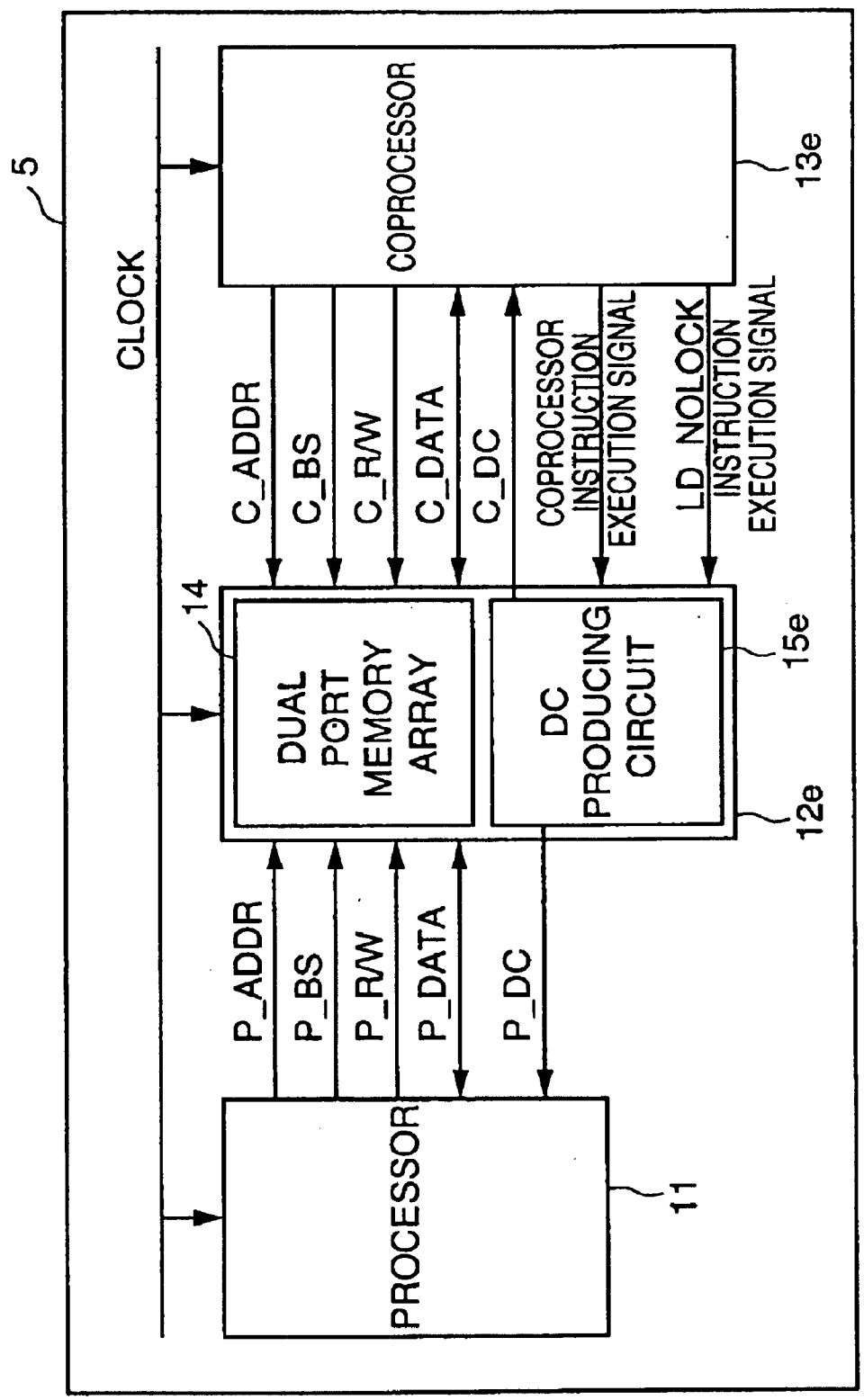
FIG. 16 is a block diagram showing a schematic structure of a processor system of a fifth embodiment of the invention.

FIG. 16 is a block diagram showing a schematically structure of the processor system of the fifth embodiment of the invention. The structure of processor system 5 differs from the structure of the processor system of the first embodiment shown in FIG. 1 only in the structures of the DC producing circuit and coprocessor 13. Description of the same structures and functions is not repeated.

Figure 17:
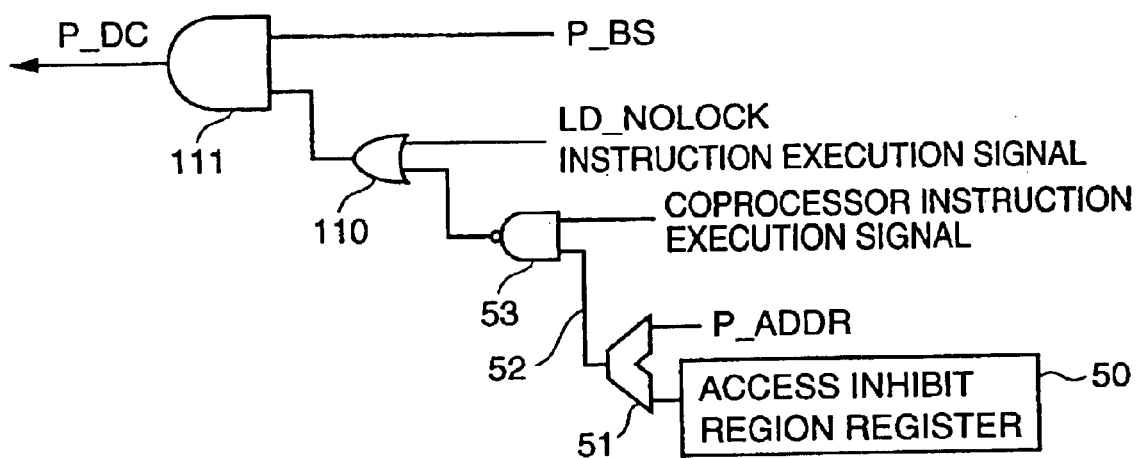
FIG. 17 shows an example of a circuit issuing a P_DC signal to processor 11.

FIG. 17 shows an example of the circuit for producing the P_DC signal to be sent to processor 11. This P_DC producing circuit is depicted as a circuit, which operates with zero wait states when processor 11 performs normal access to a shared memory 12e. The P_DC producing circuit includes access inhibit region register 50, comparator 51, NAND circuit 53, an inverter 110 and an AND circuit 111.

When processor 11 accesses a region corresponding to the address stored in access inhibit region register 50, match signal 52 sent from comparator 51 attains H-level. If coprocessor 13a is executing the coprocessor instruction in the above state, the coprocessor instruction execution signal attains H-level so that the output of NAND circuit 53 attains L-level. If the coprocessor instruction is an LD_NOLOCK instruction, however, the LD_NOLOCK instruction execution signal attains H-level so that the output of OR circuit 110 attains H-level, and the P_BS signal attains H-level. As a result, the output (i.e., P_DC signal) of AND circuit 111 attains H-level, and processor 11 does not enter the wait state.

According to the processor system of this embodiment, as described above, coprocessor 13e has an instruction allowing access to shared memory 12e even if it is locked. Therefore, processor 11 can access shared memory 12e so that program debug of the processor and coprocessor can be performed easily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A synchronous signal producing circuit for synchronizing access by a processor and a coprocessor to a shared memory, comprising:
    an access inhibit region register for designating an access inhibit region for said processor in said shared memory;
    a comparing circuit for detecting the access by said processor to said access inhibit region designated in said access inhibit region register; and
    a first logic circuit for issuing a signal setting said processor to a wait state based on a signal indicating that said coprocessor is executing a coprocessor instruction as well as a result of the comparison by said comparing circuit, and maintaining said signal setting said processor to the wait state until said processor completes to execute the coprocessor instruction.

2. The synchronous signal producing circuit according to claim 1, wherein
    said first logic circuit is configured for issuing the signal setting said processor to the wait state based on the signal indicating that said coprocessor is executing the coprocessor instruction, the result of the comparison by said comparing circuit and a signal indicating that locking of said shared memory is to be released.

3. The synchronous signal producing circuit according to claim 1, further comprising:
    a bus wait counter for counting the number of bus wait cycles; and
    a second logic circuit for issuing a bus error signal to said processor based on the signal indicating that said coprocessor is executing the coprocessor instruction, the result of the comparison by said comparing circuit and a count value of said bus wait counter.

4. The synchronous signal producing circuit according to claim 1, further comprising:
    a first initial value register for setting a wait number at the time when the signal issued by said first logic circuit sets said processor to the wait state;
    a second initial value register for setting a wait number at the time of normal access by said processor;
    a selector for selecting the values in said first and second initial value registers based on the signal indicating that said coprocessor is executing the coprocessor instruction as well as the result of the comparison by said comparing circuit; and
    a bus wait counter for receiving the value selected by said selector, and issuing a bus error signal to said processor when said bus wait counter counts the selected value.

5. The synchronous signal producing circuit according to claim 1, further comprising:
    a second logic circuit for issuing a signal setting said processor to a low power consumption mode based on the signal indicating that said coprocessor is executing the coprocessor instruction as well as the result of the comparison by said comparing circuit.

6. The synchronous signal producing circuit according to claim 1, further comprising:
    a coprocessor instruction execution flag for holding information indicating that said coprocessor is executing the coprocessor instruction, wherein
    said first logic circuit issues a signal for setting said processor to the wait state based on the information held in said coprocessor instruction execution flag and the result of the comparison by said comparing circuit.

7. The synchronous signal producing circuit according to claim 6, wherein
    said access inhibit region register includes a first access inhibit region register for designating a first access inhibit region for said processor in said shared memory, and a second access inhibit region register for designating a second access inhibit region for said processor in said shared memory;
    said comparing circuit includes a first comparing circuit for detecting the access by said processor to said first access inhibit region designated in said first access inhibit region register, and a second comparing circuit for detecting the access by said processor to said second access inhibit region designated in said second access inhibit region register;
    said coprocessor instruction execution flag includes a first coprocessor instruction execution flag for holding information indicating that said coprocessor is executing the coprocessor instruction, and a second coprocessor instruction execution flag; and
    said first logic circuit includes a second logic circuit for issuing a signal for setting said processor to the wait state based on the information held in said first coprocessor instruction execution flag and the result of the comparison by said first comparing circuit, and a third logic circuit for issuing a signal for setting said processor to the wait state based on the information held in said second coprocessor instruction execution flag and the result of the comparison by said second comparing circuit.

8. A processor system comprising:
    a processor;
    a coprocessor;
    a shared memory connected to said processor and said coprocessor; and a synchronous signal producing circuit for synchronizing access by said processor and said coprocessor to said shared memory, wherein said synchronous signal producing circuit includes:

an access inhibit region register for designating an access inhibit region for said processor in said shared memory;

a comparing circuit for detecting the access by said processor to said access inhibit region designated in said access inhibit region register; and a first logic circuit for issuing a signal setting said processor to a wait state based on a signal indicating that said coprocessor is executing a coprocessor instruction as well as a result of the comparison by said comparing circuit, and maintaining said signal setting said processor to the wait state until said coprocessor completes to execute the coprocessor instruction.

9. The synchronous signal producing circuit according to claim 8, wherein said first logic circuit is configured for issuing the signal setting said processor to the wait state based on the signal indicating that said coprocessor is executing the coprocessor instruction, the result of the comparison by said comparing circuit and a signal indicating that locking of said shared memory is to be released.

10. The synchronous signal producing circuit according to claim 8, further comprising:

a bus wait counter for counting the number of bus wait cycles; and a second logic circuit for issuing a bus error signal to said processor based on the signal indicating that said coprocessor is executing the coprocessor instruction, the result of the comparison by said comparing circuit and a count value of said bus wait counter.

11. The synchronous signal producing circuit according to claim 8, further comprising:

a first initial value register for setting a wait number at the time when the signal issued by said first logic circuit sets said processor to the wait state;

a second initial value register for setting a wait number at the time of normal access by said processor;

a selector for selecting the values in said first and second initial value registers based on the signal indicating that said coprocessor is executing the coprocessor instruction as well as the result of the comparison by said comparing circuit; and a bus wait counter for receiving the value selected by said selector, and issuing a bus error signal to said processor when said bus wait counter counts the selected value.

12. The synchronous signal producing circuit according to claim 8, further comprising:

a second logic circuit for issuing a signal setting said processor to a low power consumption mode based on the signal indicating that said coprocessor is executing the coprocessor instruction as well as the result of the comparison by said comparing circuit.

13. The synchronous signal producing circuit according to claim 8, further comprising:

a coprocessor instruction execution flag for holding information indicating that said coprocessor is executing the coprocessor instruction, wherein said first logic circuit is configured for issuing a signal for setting said processor to the wait state based on the information held in said coprocessor instruction execution flag and the result of the comparison by said comparing circuit.

14. The synchronous signal producing circuit according to claim 13, wherein said access inhibit region register includes a first access inhibit region register for designating a first access inhibit region for said processor in said shared memory, and a second access inhibit region register for designating a second access inhibit region for said processor in said shared memory;

said comparing circuit includes a first comparing circuit for detecting the access by said processor to said first access inhibit region designated in said first access inhibit region register, and a second comparing circuit for detecting the access by said processor to said second access inhibit region designated in said second access inhibit region register;

said coprocessor instruction execution flag includes a first coprocessor instruction execution flag for holding information indicating that said coprocessor is executing the coprocessor instruction, and a second coprocessor instruction execution flag; and said first logic circuit includes a second logic circuit for issuing a signal for setting said processor to the wait state based on the information held in said first coprocessor instruction execution flag and the result of the comparison by said first comparing circuit, and a third logic circuit for issuing a signal for setting said processor to the wait state based on the information held in said second coprocessor instruction execution flag and the result of the comparison by said second comparing circuit.

15. A method of producing a synchronous signal for synchronizing access by a processor and a coprocessor to a shared memory, comprising the steps of:

designating an access inhibit region for said processor in said shared memory;

detecting the access by said processor to said designated access inhibit region; and producing a signal setting said processor to a wait state based on a signal indicating that said coprocessor is executing a coprocessor instruction as well as a result of said detection, and maintaining said signal setting said processor to the wait state until said coprocessor completes to execute the coprocessor instruction.

16. The method of producing the synchronous signal according to claim 15, wherein said step of producing the signal setting said processor to the wait state produces said signal setting said processor to the wait state based on the signal indicating that said coprocessor is executing the coprocessor instruction, said result of the comparison and a signal indicating that locking of said shared memory is to be released.

17. The method of producing the synchronous signal according to claim 15, further comprising the steps of:

counting the number of bus wait cycles; and issuing a bus error signal to said processor based on the signal indicating that said coprocessor is executing the coprocessor instruction, said result of the comparison and said bus wait cycle number.

18. The method of producing the synchronous signal according to claim 15, further comprising the steps of:

setting a wait number at the time when said signal setting said processor to the wait state sets said processor to the wait state;

setting a wait number at the time of normal access by said processor;

selecting said set wait number at the time when said processor attains the wait state and said set wait number at the time of normal access by said processor based on the signal indicating that said coprocessor is executing the coprocessor instruction as well as said result of the detection; and counting waiting cycles, and issuing a bus error signal to said processor when the number of the counted wait cycles reaches said selected value.

19. The method of producing the synchronous signal according to claim 15, further comprising the step of:

issuing a signal setting said processor to a low power consumption mode based on the signal indicating that said coprocessor is executing the coprocessor instruction as well as said result of detection.

20. The method of producing the synchronous signal according to claim 15, further comprising the step of:

holding information indicating that said coprocessor is executing the coprocessor instruction, wherein said step of producing the signal setting said processor to the wait state produces said signal setting said processor to the wait state based on said held information and said result of detection.

* * * * *